United States Patent [19]

Ventres et al.

[11] Patent Number: 5,462,758

[45] Date of Patent: Oct. 31, 1995

[54] METHOD OF MAKING MACARONI OR NOODLE PRODUCTS USING A LOW MOISTURE CONTENT ALIMENTARY PASTE

[75] Inventors: Romeo J. Ventres, New York; Edward A. Matuszak, Liverpool; Carleton G. Merritt, Phoenix, all of N.Y.

[73] Assignee: Borden, Inc., Columbus, Ohio

[21] Appl. No.: 624,480

[22] Filed: Dec. 10, 1990

Related U.S. Application Data

[63] Continuation of Ser. No. 231,663, Aug. 12, 1988, abandoned, which is a continuation of Ser. No. 39,744, Apr. 20, 1987, abandoned.

[51] Int. Cl.⁶ .................................. A23P 1/12; A23L 1/16
[52] U.S. Cl. .................. 426/557; 426/451; 426/457; 426/511; 426/516
[58] Field of Search .................................. 426/557, 451, 426/457, 511, 516, 517

[56] References Cited

U.S. PATENT DOCUMENTS

| | | | |
|---|---|---|---|
| 1,349,524 | 8/1920 | Miner | 426/557 |
| 2,366,366 | 7/1941 | Souder | 426/557 |
| 3,484,251 | 12/1969 | Lawrence | 426/557 |
| 3,762,931 | 12/1970 | Craig et al. | 426/557 |
| 3,992,554 | 7/1975 | Blake et al. | 426/557 |
| 4,044,165 | 8/1977 | Baumann | 426/557 |
| 4,539,214 | 8/1982 | Winter et al. | 426/557 |
| 4,540,590 | 9/1985 | Harada et al. | 426/324 |
| 4,568,550 | 2/1986 | Fulger et al. | 426/19 |
| 4,675,199 | 6/1987 | Hsu | 426/516 |

FOREIGN PATENT DOCUMENTS

| | | | |
|---|---|---|---|
| 0084831 | 8/1983 | European Pat. Off. | 426/557 |
| 0139813 | 5/1985 | European Pat. Off. | |
| 0213204 | 3/1987 | European Pat. Off. | |
| 1280555 | 7/1972 | United Kingdom. | |

OTHER PUBLICATIONS

O'Keefe, "Twin–Screw Extruder—Food Reactor of the Future", *Food in Canada*, vol. 39, published 1979.
Wu et al., "Denaturation of Plant Proteins", *Journal of Food Science*, vol. 39, published 1974.
Manual for Operating the F20 Model Pilot Plant.

*Primary Examiner*—Steve Alvo
*Attorney, Agent, or Firm*—Roylance, Abrams, Berdo & Goodman

[57] ABSTRACT

A method for making shaped pasta products having a reduced moisture content. The drying requirements for these shaped pasta products are substantially reduced permitting a substantial savings in energy and time. Processing at reduced moisture levels is accomplished by operating at higher extrusion temperatures. The temperature is selected so as to avoid cooking the extruded alimentary pastes. Dried, uncooked pastas having a unique appearance are also provided.

5 Claims, 1 Drawing Sheet

METHOD OF MAKING MACARONI OR NOODLE PRODUCTS USING A LOW MOISTURE CONTENT ALIMENTARY PASTE

This application is a continuation of application Ser. No. 231,663, filed Aug. 12, 1988 now abandoned which application is a continuation of application Ser. No. 039,744, filed Apr. 20, 1987 now abandoned.

BACKGROUND OF THE INVENTION

This invention is directed to an energy efficient method for producing alimentary pastes. The terms "alimentary pastes" and "pastes", as used herein, refer to the flour and water mixtures commonly known as pasta, such as spaghetti, macaroni, noodles, ziti, etc.

Alimentary pastes are generally made from coarse, hard flours obtained from hard wheat such as the middlings of durum wheat, often referred to as "semolina flour" or "semolina". Semolina comprises a major portion of the flour in alimentary pastes because it is highly glutinous and provides a self-supporting pasta. Shaped products made therefrom will substantially maintain their original form after subsequent processing, such as cooking. The term "cooking", as used herein, refers to the process of gelatinizing the starch and denaturing the protein to form a firm, rigid matrix within the alimentary paste, which occurs upon heating the alimentary paste.

Pastas are commercially available in many forms including cooked, partially cooked and uncooked forms. Cooked pasta is defined herein to mean pasta wherein substantially all of the starch is gelatinized. Uncooked pasta is defined herein to mean pasta wherein a major portion of the starch is ungelatinized, i.e., greater than about 80% by weight of the total starch content is ungelatinized. The term "uncooked pasta" includes pasta wherein none of the starch is gelatinized. Starch gelatinization is generally accompanied by protein denaturation. Although protein denaturation is of greater concern, starch gelatinization can be quantified with greater accuracy and is therefore used herein to define cooked and uncooked pasta.

There are advantages to each of these types of pasta products; however, the most common form of pasta that is purchased at retail is dry and uncooked pasta. This form is the most versatile in that the product may be stored at room temperature for long periods of time. In addition, pasta in this form maintains its highly glutinous properties in that a substantial portion of protein is undenatured, providing a firm paste upon cooking. Partially cooked and cooked pastas provide the advantage of rapid preparation but often require special packaging, exhibit reduced firmness and product quality, and often have a shorter shelf life than uncooked pasta.

Processes for the commercial manufacture of dry, uncooked pasta are well known. In these processes, water and semolina flour are mixed within an extruder to provide the alimentary paste. This paste is forced through holes in the extruder die at a high pressure and at an elevated temperature, to obtain the desired cross-sectional shape. The extrudate is often cut to desired lengths. In a conventional pasta extrusion process, the alimentary paste exhibits a moisture level of about 30 weight percent and is maintained at a temperature of about 120° F. (49° C.). Moisture levels of about 30 weight percent are utilized to maintain the viscosity of the alimentary paste sufficiently low to prevent excessive pressure within the extruder and simplify the blending procedure. Temperatures of about 120° F. (49° C.) have been utilized to prevent cooking, i.e., gelatinization of the starch and denaturation of the protein within the alimentary paste. Utilizing high temperatures and low moisture pastes in extrusion processes to produce cooked alimentary pastes is known. For example, Bauman, U.S. Pat. No. 4,044,165, and Fulger, U.S. Pat. No. 4,568,550, each disclose the production of pre-cooked pastas by extrusion techniques where temperatures above 120° F. (49° C.) are utilized. O'Keefe, *Food in Canada*, pages 16–19 (Jan. 1979), discloses the use of low moisture pastes in producing cooked pasta.

Drying is the most time consuming step in the preparation of uncooked pastas. The extrudate generally has a moisture level of about 28 weight percent or above which must be reduced to a value of about 12%–14% to permit storage of the product at ambient conditions. The drying step, or steps, may require from about 18–36 hours. Since the pasta is in its final extruded shape, drying is a very delicate operation. Accelerating the drying process may affect the integrity of the finished product in that the pasta may warp or crack.

Reducing this drying period without affecting the integrity of the pasta product is advantageous when producing dry, uncooked pasta, since the energy expended is significantly reduced, thus reducing the cost of production.

Craig et al., U.S. Pat. No. 3,762,931, disclose a method for processing low moisture alimentary pastes wherein modifying agents (flow modifiers) are added in significant quantities to reduce the pressure within the extruder. However, it is desirable to obtain shaped, low moisture alimentary pastes wherein the paste composition is not modified significantly to enhance processability. A product with these flow modifiers may not satisfy the definitions ("Standard of Identity") necessary to permit the pasta product to be marketed as "macaroni", "noodles", etc., under Food and Drug Administration Regulations, 21 CFR Chapter 1 §§139.110–139.180 (Apr. 1, 1986).

SUMMARY OF THE INVENTION

The present invention involves selecting an extrusion temperature for the alimentary paste at or above 130° F. (54° C.), which is sufficiently low to prevent "cooking", i.e., to maintain gelatinization of the starch and denaturation of the protein at a minimum. Preferably, starch gelatinization is maintained below about 10 weight percent of the total starch content of the extruded alimentary paste.

The process of this invention is performed by feeding and blending a feedstock comprised of glutinous flour and water within an extruder to form an alimentary paste, the alimentary paste having a total moisture content at or below 28% by weight. This alimentary paste is forced through the holes in the extruder die by internal pressure. The temperature of the alimentary paste during extrusion is prescribed by the parameters defined above. These parameters will dictate different temperature values for pastes of varying moisture content.

When a reference is made in this application to the "extrusion temperature", it will be understood by those skilled in the art that the temperature referred to is, in fact, the temperature of the extruder barrel. It is almost impossible to measure the temperature of the paste as it is extruded from the die, and it is not feasible to measure the temperature of the paste within the bore of the barrel of the extruder. Consequently those skilled in the art ordinarily refer to the temperature at which the extruder barrel is maintained as the extrusion temperature. Generally this is close to or substantially the same as the temperature of the extruder die. Since the operation of the screw within the barrel of the extruder generates a good deal of heat by friction, it is common to control the barrel temperature by the use of a circulating water jacket. Somewhat similarly, the extruder die may be either heated or cooled, depending upon operating conditions, extrusion configuration, and the like. For the purposes of this invention, however, the extruder die is generally heated, preferably electrically heated.

BRIEF DESCRIPTION OF THE DRAWING

FIGS. 1–3 illustrate samples of variegated extruded pasta in the form of elbows, obtained in accordance with Example 10, below.

DETAILED DESCRIPTION OF THE INVENTION

Figure 1:
FIGS. 1–3 are perspective representations of extruded pasta products manufactured in accordance with one preferred embodiment of this invention. More particularly.

In performing the process of this invention, a feedstock comprised of glutinous flour and water is utilized. The term "glutinous flour" as used herein is intended to include and describe flours which provide a self-supporting paste when mixed with water. Such a self-supporting paste, once shaped, will substantially retain its original form at ambient conditions or after subsequent processing, such as drying or cooking. Semolina flour, also referred to as "semolina" herein, is a common, hard, coarse, wheat flour obtained from durum wheat. The definition or "Standard of Identity" for semolina flour is generally a flour obtained from durum wheat which passes through a 20 mesh sieve and not more than 3% by weight passes through a 100 mesh sieve. There are different grades of semolina having different glutinous properties. Both high grade and low grade semolina are intended to be included in the glutinous flours suitable for this invention. Other coarse, glutinous flours, obtained from more uncommon grains may be used in place of semolina and are intended to be included within the scope of the term "glutinous flour". In addition, fine flours such as durum flour, wherein 98 weight percent passes through a 70 mesh sieve, are also suitable and are intended to fall within the scope of the term "glutinous flour" used herein. These fine flours may be preferred where it is difficult to obtain adequate blending with water from the equipment utilized. The only requirement for the flour is that it provide a self supporting paste upon admixture with water. The glutinous flour preferably comprises at least 75% by weight of the dry ingredients. Preferred glutinous flours are semolina and durum flour. Non-glutinous flours, which do not provide a self-supporting paste upon admixture with water, such as rice, may be added to the feedstock although they do not fall within the scope of the term "glutinous flour" as used herein. Other additives, including seasonings, vitamins, dyes, egg, flavorings, such as cheese, beef and chicken, and vegetable solids such as spinach, may be added for flavor, color, nutrition or other additive effect.

Water is a necessary part of the feedstock for the extrusion process of this invention since glutinous flours, such as semolina, do not have a water content sufficiently high to provide a low viscosity alimentary paste which can be processed without significant cooking of the paste. Preferred pastes exhibit a moisture content greater than about 18 weight percent. However, lower values for moisture content are suitable where flow modifiers are used. Semolina flour typically has a moisture content of 13–15 weight percent. In performing this invention, the quantity of added water provides a moisture level for the feedstock which does not exceed 28% by weight. This moisture level value for the feedstock includes the initial moisture content of the glutinous flour, which for semolina is about 13–15 weight percent, plus the moisture provided by added water.

The moisture contents of the glutinous flour, the alimentary paste feedstock, the extruded alimentary paste and the dried pasta product, respectively, may be determined by the procedures set forth in the 9th Ed. *Association of Organized Agriculture Chemists* (AOAC), Method 13.112, which is incorporated herein by reference. Other methods are also suitable but the procedures incorporated above are used to define the moisture values described herein.

The term "water", as used herein, refers to substantially pure forms of water, such as distilled water, well water, spring water and the like, and those liquids wherein water is a major component such as milk, broths, juices and the like. Furthermore, the term "water", as used herein, includes water in all physical states, such as steam, ice and liquid.

Special mention is made of the additives salt and glycerol monostearate. These are two ingredients commonly found in commercial pastas. Salt provides flavor while glycerol monostearate functions as an emulsifier or lubricant, i.e., flow modifier, which reduces the viscosity of the alimentary paste, making extrusion easier. The use of glycerol monostearate will reduce the pressure within the extruder. Also suitable are the flow modifiers or "modifying agents" disclosed by Craig et al. in U.S. Pat. No. 3,762,931, i.e. whey solids in conjunction with sulfhydryl reducing substances, such as L-cysteine, glutathione and sulfite salts (sodium bisulfite and calcium sulfite). The description of these "modifying agents" at column 6, line 57, to column 8, line 43, of Craig et al. is incorporated herein by reference. It is noted that much smaller quantities of these "modifying agents" (0.025–0.1 weight percent) provide effective results in this invention in comparison to the amounts used by Craig et al. The addition of flow modifiers or "modifying agents" is not essential to the performance of this invention.

The components of the feedstock may be separately introduced to the extruder or they may be premixed to form a preliminary paste. Commercial equipment is available for handling both types of feedstocks. To ensure a uniform product however, separate metering of the feedstock components is often preferred.

The term "extruder", as used herein, refers to those devices which generally comprise a threaded screw positioned within a barrel having a means for receiving components to be mixed, such as a feed hopper positioned at one end, a means for discharging mixed components at the opposing end of the device, and a means for rotating the screw within the barrel. An example of a discharging means is a die having holes for the passage of the mixed materials, positioned at the end of the screw. The temperature within an extruder may be controlled by the use of a water jacket which surrounds the barrel, if desired. Conventional extruders utilized in the preparation of alimentary pastes or plastics are well suited for this invention. These include both single screw and twin screw extruders. Examples of suitable extruders include those marketed by Brabender, Mapimpianti (GF 20 series), Buhler, DeMaco, and Braibanti.

The alimentary paste is forced through the holes of the extruder die to obtain the desired shape. The holes in the extruder die prescribe the profile of the paste. The paste passes through the die due to internal pressures generated by the rotating screw or screws. The extruded paste may be cut to desired lengths to provide a product in substantially final form. Cutting generally occurs at the extruder die and may be carried out in a conventional manner. Cutting is not essential to the practice of this invention since the alimentary paste may be formed into desired lengths by pulling the extrudate away from the die. All conventional pasta shapes are obtainable by this invention.

An important feature of this invention is selecting the temperature at which the alimentary paste is blended within the extruder. The temperature must be sufficiently low to maintain the paste uncooked, i.e., maintain more than 80% by weight of the total starch within the paste ungelatinized, preferably 90% or more. The upper temperature limit may vary in that starch gelatinization is dependent on many variables such as moisture level, paste composition, process equipment, etc. Because of this multiple dependency, at temperature values significantly below the upper limit, a minor change in temperature may not be accompanied by a corresponding change in starch gelatinization.

Some starch gelatinization and some protein denaturation always take place during extrusion, even under conventional or "standard" operating conditions. This is due to the high shear environment within the extruder, where heat and pressure are generated internally. Starch gelatinization below about 10 weight percent of the total starch content is normal for conventional extrusion processes. It is preferable to maintain the level of starch gelatinization below about 10 weight percent where dry, uncooked pastas are the desired end products in that such values are often accompanied by low levels of protein denaturation.

Protein denaturation during extrusion is preferably kept at as low a level as possible. The optimum temperature will vary with the level of moisture within the alimentary paste. Lower moisture values within the alimentary paste generally permit the paste to attain higher temperatures without significant protein denaturation. Temperatures as high as 190° F. (88° C.) have little effect on protein denaturation and starch gelatinization during extrusion of pastes having about a 20.8 weight percent moisture content. Protein denaturation prior to final cooking of the alimentary paste often leads to a weak protein matrix and infirm or mushy pasta upon final cooking. Premature protein denaturation is evidenced by a product loss upon cooking in boiling water due to the release of starch. A product loss below about 10 weight percent of the total pasta product after final cooking in boiling water is average for pasta products obtained by conventional extrusion techniques. It is desirable to maintain product loss at or below this level.

While the temperature of the alimentary paste should be sufficiently low so as to maintain the paste uncooked, it should also be sufficiently high to attain a value at or above about 130° F. (54° C.) during blending. The larger the proportion of alimentary paste within the extruder which attains a temperature value at or above 130° F. (54° C.), the easier processing becomes. It may be desirable to maintain the temperature of the alimentary paste at a value at or above 130° F. (54° C.) throughout the extruder by pre-heating the feedstock to about 130° F. (54° C.). It is more convenient however, to heat the paste to temperatures at or above 130° F. (54° C.) within the extruder. Maintaining a substantial portion of the alimentary paste within the extruder, i.e., about 50% by weight and above of the total extruder contents, at a temperature at or above 130° F. (54° C.) is preferred. Maintaining the body of the alimentary paste that is adjacent the extruder die at a temperature at or above 130° F. (54° C.) is most preferred. Typically, the extruder is filled with alimentary paste during operation and the portion of alimentary paste which has a temperature at or above 130° F. (54° C.) generally corresponds to that portion of the extruder barrel which has a temperature at or above 130° F. (54° C.).

The temperature of the paste may vary within the extruder because the heat that is generated by friction at different points within the extruder varies. The temperature of the paste can also vary by passing through different cooling or heating zones within the extruder barrel. This may be desired where blending is intensified at separate locations in the extruder or components of the paste are added downstream of the feed hopper. However, the highest temperature experienced by the alimentary paste should be at or above 130° F. (54° C.) and should be sufficiently low so as to maintain the paste uncooked, preferably below 190° F. (88° C.). The process may be performed continuously, semi-continuously or batch-wise.

It is most preferable to utilize a temperature that is at or above 130° F. (54° C.) for the alimentary paste and which is sufficiently high to maintain the internal pressure on the extruder die below about 250% of the values experienced at standard conditions. The phrase "standard conditions", as used herein, refers to the combination of an extruder barrel temperature of 120° F. (49° C.) and an alimentary paste moisture content of about 30 weight percent. The pressures generated under such conditions are generally below 2000 psig in conventional commercial extruders. These pressure values will vary with the equipment utilized.

The process of this invention is capable of maintaining the internal pressure on the extruder die at levels below about 150% of those experienced at standard conditions for pastes having a moisture content of about 23%–24% by weight. At lower moisture levels, i.e., about 20%–21%, pressures below about 160% of those at standard conditions are obtained where emulsifiers/flow modifiers are additionally added. When performing the process of this invention within commercial equipment, maintaining the internal pressure on the extruder die below about 2500 psig is preferred. The lowest pressures obtainable are most preferred from the standpoint of energy consumption and equipment life.

It is difficult to measure the temperature of the paste directly since it is flowing within the extruder. The extruder barrel temperature is an acceptable approximation of this value for conventional extruders operating at conventional screw speeds. When measuring barrel temperature, a pyrometer may be affixed to the extruder barrel surface to provide temperature values or the temperature of the water (or other cooling fluid) within a surrounding water jacket may be monitored with a thermometer to provide such values. Other methods for measuring barrel temperature are also suitable.

It is expected that extreme extrusion conditions, such as very high screw speeds, or unconventional extrusion equipment, may not permit adequate temperature equilibration for the barrel temperature to reflect the temperature of the paste within. In such a situation, the extrudate temperature may be used as an acceptable approximation of the temperature of the paste within the extruder, unless significant heat transfer takes place at the extruder die. The temperature of the extrudate may also be taken for purposes of comparison with barrel temperatures. This will confirm the accuracy of barrel temperatures used to approximate the paste temperature during extrusion.

Where either the barrel temperature or extrudate temperature have a value of 130° F. (54° C.) or above, respectively, and these temperatures are attributed to the heat of friction within the extruder, it is presumed that the paste within the extruder attains a value of 130° F. (54° C.) or above. In such a case, it is irrelevant whether the barrel temperature or extrudate temperature is a good approximation of the paste temperature during extrusion, since the process falls within the scope of this invention where low moisture pastes are used.

Where the barrel temperature and extrudate temperature have a value below 130° F. (54° C.), an internal pyrometer may be inserted in the process equipment, at a convenient location, such as between the extruder barrel and extruder die, to determine if the paste attains a value at or above 130° F. (54° C.).

Alternatively, where insertion of a pyrometer is not convenient in the equipment utilized, a model of such equipment with a pyrometer internally inserted at a point or points along the extruder barrel may be used to determine if the paste within attains a value at or above 130° F. (54° C.). Other means for determining the temperature of the paste within the extruder are also suitable. It is important to note that obtaining temperature values for the paste within the extruder is not an essential step in the process of this invention.

As indicated above, it is preferable to maintain the level of starch gelatinization below 10 weight percent of the total starch content and product loss below 10 weight percent of the total pasta product after cooking. Those skilled in the art will be capable of obtaining a proper balance of alimentary paste moisture content and operating temperature to achieve these results. The paired values which appear in the accompanying Examples will serve as a guide. Different levels of gelatinization and denaturation may occur for different blends of alimentary paste and for different types of equipment utilized.

Where conventional equipment is utilized, preferred barrel temperatures fail in the range of about 130°–190° F. (54°–88° C.). Barrel temperatures much higher than 190° F. (88° C.) may cause significant gelatinization and denaturation unless other methods are used to ease extruder pressure, such as the use of flow modifiers. Examples of some preferred combinations of barrel temperatures and paste moisture levels are as follows:

150°–160° F. (66°–71° C.) for 23.0–23.7 weight percent $H_2O$ and

170°–175° F. (77°–79° C.) for 20.5–21.5 weight percent $H_2O$.

Heat generated by friction within the extruder is often more than sufficient to provide the necessary operating temperatures. Alternatively, the extruder barrel may be heated by external water jackets or an electrical resistance heater.

A further step in easing the pressure within the extruder is to heat the die head of the extruder to approximate the temperature of the extruder barrel and the paste within. This can be accomplished with a conventional electrical resistance heating element, disposed about the die head. Where the die head is heated, die pressures may be maintained within about 120% of the values for pressure at standard conditions of a barrel temperature of 120° F. (49° C.) and a paste moisture content of 30% by weight.

Upon performing the process of this invention, the alimentary paste is preferably dried to provide commercial pasta products. This drying procedure may vary significantly, being either a multi-step procedure, where the pasta is exposed to different drying conditions, or a simple air drying procedure, where the pasta is permitted to stand at room temperature. Whatever drying procedure is used, the time required for completion will be reduced by the practice of the present invention, since the extruded product has a substantially reduced moisture content. Drying times can be reduced by as much as 50%–80%, or to about 8 hours as opposed to 16–20 hours for pastes of higher moisture contents. Conventional drying equipment, i.e., either batch or continuous dryers, such as tray and drum dryers, may be used. The dried product so obtained should generally have a moisture content below about 13% by weight after 8 hours.

Figure 2:
Figure 3:

Embodiments of this invention include pasta products made by the processes described above. These pasta products have been found to retain a greater portion of the Beta-carotene and other carotenoids, such as alpha-carotene and gamma-carotene, originally present in glutinous flour, particularly semolina flour, which provides the natural yellow color of the flour. Also included in this invention are the dried pasta products having variegations as shown in FIGS. 1–3. This variegated appearance disappears upon cooking the dried pasta product, to provide a substantially uniform color. The dried pasta obtained by the practice of certain embodiments of the processes disclosed herein exhibit dark and light colorations, with a major portion of light colorations. Approximately at least 25% of the pasta surface area exhibits light colorations. At least about 5% of the surface area exhibits dark colorations. These variegated pastas often have a streaked appearance with portions showing uniform striations. The streaks of color, or striations, run in the direction of the extrusion of the paste from the extruder die. These variegated pastas typically have the natural color of the glutinous flour, such as semolina flour, but may be dyed with natural or artificial colors. These variegated pastas are easily obtained with an extruder having a variation in screw diameter. It is important to note that (1) the processes of this invention include the production of pastas having uniform coloration and (2) the dried pasta products of this invention with high natural color (Beta-carotene and other carotenoids) are not limited to variegated pastas.

The following Examples are provided to further illustrate the invention. In these Examples and throughout the specification, all temperatures are expressed in degrees Fahrenheit and each value is accompanied by an approximation of such value in degrees Celsius. In addition, all percentages are by weight, unless expressly indicated to be otherwise.

Experimental: General

The feedstocks used in all of the Examples below comprised about 4000 grams of semolina flour having about a 13.8% moisture content. The quantity of added water was often varied with each Example and this quantity is specified within each Example. Where other dry ingredients were present in the feedstock, i.e., glycerol monostearate and/or salt, the dry components were initially mixed in a standard Hobart mixer for a period of two minutes at the lowest speed. Water was added slowly to the Hobart mixer over a period of 2–4 minutes while the mixer was in operation. Following the addition of the water, the feedstock mixture was allowed to mix for about 6 minutes. Moisture levels for the pastes and flour were determined by the procedures described in 9th Ed. *AOAC*, Method 13.112.

The premixed feedstock was then placed in the "former vessel" of a Mapimpianti GF 20 extruder (available from Mapimpianti, Padova, Italy). Only the F-20 section of the Mapimpianti extruder was used. The screw used was about 20.5 inches (520 mm) long with an 80 mm diameter for about the first 4 inches (100 mm) and a 56 mm diameter for the remaining 16.5 inches (about 420 mm). The screw operated at about 16 r.p.m. The extruder held about 800 grams of paste. The dwell time in the extruder ranged from 40 to 100 seconds. A Mapimpianti #1011 die was used in Examples 1–23. It had 18 openings of about an 8 mm diameter and a wall thickness of about 0.7 mm$^2$. In Examples 24–29, a Maldari die #43077 having 29 openings of about a 5 mm diameter and 0.7 mm wall thickness was used. The Mapimpianti #1011 die has total openings of about 289 mm$^2$ and the Maldari die has total openings of about 275 mm. In all Examples, the extrudate was cut at the die to provide elbows about an inch in length. A conveyor removed the cut product.

The F-20 section of the GF 20 extruder was modified to accommodate the premixed feedstock by removal of the feed mechanisms for the separate addition of water and semolina and by covering each opening in the barrel for the separate feeds with a 6×4 inch plate. The extruder water jacket, which surrounds about ⅔ of the final portion of the extruder, was split into two sections and equipped with independent control systems. Water having a temperature about equal to the desired barrel temperature was circulated through the extruder water jackets from a ten gallon (about 38 liters) reservoir. The water heated the extruder prior to start up and maintained a substantially constant temperature during operation. Cold water was added to the reservoir to compensate for the heat absorbed. The opening to the former vessel was reduced from 3 inches to 1 inch by welding a stainless steel plate thereto to prevent backfeeding of the premixed feedstock. The blades of the former vessel operated at about 10 to 160 r.p.m.

After the extruder barrel was filled with paste by starting the extruder, the pressure was reduced in the former vessel by a vacuum pump (500–600 mm). The temperature of the premixed feedstock for each Example was about 70° F. (21° C.). The values reported in each Example for the barrel temperature reflect the average temperature of the circulating water measured in each water jacket, throughout the extrusion, by thermometers inserted therein. The temperature of the extruded paste was found to be within ±5° F. (about 2°–3° C.) of the circulating water temperature for all Examples.

The moisture level for the extruded paste reported in each Example is an average of the measured values for the first and last samples of elbows extruded from a given feedstock. These samples were sealed in glass jars and the moisture levels determined by the procedures described in 9th Ed. *AOAC*, Method 13.112. A difference in the moisture content for the initial extrudate and final extrudate of about 2% by weight of the total alimentary paste was common in the Examples reported.

A 1000 watt electrically heated band was wrapped around the die housing with a 22 amp variable power stat to heat the die where applicable. Pressure on the die head (extruder die) was determined by the use of a hollow tube gauge positioned just ahead of the extruder die. Where applicable, the extruded paste was tray dried at 170° F. (77° C.) in about 65% relative humidity. Final moisture contents ranged from 7%–11%. The glycerol monostearate was obtained from Eastman Kodak under the label MYVAPLEX 600.

The dried extruded pastes had a variegated appearance in all Examples. Once cooked, these pastes became substantially uniform in color.

EXAMPLES: General

Controls A–D are provided to compare die pressure at standard conditions to the Examples of this invention and show how die pressure increases with decreasing moisture. The Examples below, particularly Examples 1–4 and 5–7, show how higher barrel temperatures reduce the pressure on the die head. Examples 8–10 and 11–14 show how flow modifiers, such as glycerol monostearate, further reduce the die head pressure for embodiments of this invention. Examples 15–19 show how heating the die head further reduces the pressure at the die head in accordance with this invention, while salt increases the die head pressure. Examples 20–23 show the effectiveness of this invention in reducing the die head pressure to manageable levels for pastas with extremely low moisture levels when used in combination with flow modifiers. Examples 24–29 show the effect of various modifying agents in providing pastas having a conventional appearance when practicing the invention herein.

Controls A–D

To obtain the feedstocks for each of Controls A–D, water was added in different respective amounts to the standard charge of semolina described above under the heading "Experimental". The flour feedstocks of different moisture levels respectively were extruded at a temperature of about 120° F. (49° C.) and the extruder die pressure was determined. The die pressure and moisture level values are reported in Table I and show an increase in die pressure with decreasing moisture. These Controls do not illustrate the present invention. Controls A–C approximate "standard conditions". For Control C, the temperature of the extrudate was measured and found to be about 120° F. (49° C.).

TABLE I

| Extrusion Pressures at Different Moisture Levels; Controls | | | | |
|---|---|---|---|---|
| Control | Added Water (gms) | Extrudate Moisture* (wt. %) | Barrel Temp. (°F.) | Die Pressure (psig) |
| A | 1467 | 33.3 | 120** | 1450 |
| B | 1308 | 33.9 | 120** | 1450 |
| C | 1158 | 29.1 | 120** | 1595 |
| D | 1016 | 27.4 | 120** | 2175 |

*Average % Moisture as Extruded
**49° C.

Examples 1–4

Effect of Different Temperatures

The feedstock for each of Examples 1–4, respectively, comprised the standard charge of semolina described above under the heading "Experimental" and 757 grams of water. The temperature of the extruder barrel was different for each respective Example falling within the range of from 120°–150° F. (49°–66° C.). The values for the percent moisture of the extrudate, barrel temperature and the resulting pressure on the extruder die for each Example, respectively, are reported in Table II below, and show a decrease in pressure with increasing temperature.

TABLE II

Extrusion Pressures at Different Temperatures

| Example No. | Barrel Temp. | Extrudate Moisture* (wt. %) | Die Pressure (psig) |
|---|---|---|---|
| 1 | 120° F. (49° C.) | 25.0 | 3843 |
| 2 | 130° F. (54° C.) | 23.3 | 3770 |
| 3 | 140° F. (60° C.) | 24.2 | 2770 |
| 4 | 150° F. (66° C.) | 23.6 | 2045 |

*Average % Moisture as Extruded

Examples 5–10

Effect of Different Moisture Levels

The feedstock for each of Examples 5–10, respectively, comprised the standard charge of 4000 grams of semolina described above under the heading "Experimental" and 640 grams of water. Glycerol monostearate was also added to the feedstock for Examples 8–10 in the quantity specified in Table III. The extrudate moisture content and the pressure on the die for each Example is reported in Table III. A moderate extrusion temperature having a value within the range of from 130°–170° F. (54°–77° C.) was used in each Example, respectively, and each value is reported in Table III. The temperature of the extrudate from Example 8 was taken for comparison with the barrel temperature and was measured as 157° F. (69° C.).

TABLE III

Pressure at Moderately Low Moisture Levels

| Example No. | Barrel Temp. | GMS* (gms) | Extrudate Moisture** (wt. %) | Die Pressure (psig) |
|---|---|---|---|---|
| 5 | 130° F. (54° C.) | — | 23.6 | 4205 |
| 6 | 150° F. (66° C.) | — | 23.4 | 3843 |
| 7 | 160° F. (71° C.) | — | 23.0 | 3698 |
| 8 | 160° F. (71° C.) | 5 | 23.0 | 3625 |
| 9 | 130° F. (54° C.) | 15 | 21.2 | 3842 |
| 10 | 170° F. (77° C.) | 15 | 20.8 | 2900 |

*Glycerol Monostearate
**Average % Moisture as Extruded

Examples 11–14

Effect of Different Levels of GMS Flow Modifier

The feedstock for each of Examples 11–14, respectively, comprised the standard charge of 4000 grams of semolina described above under the heading "Experimental" and 531 grams of water. Glycerol monostearate was added to each feedstock in different amounts as reported in Table IV. The barrel temperature was maintained at a constant value of 175° F. (79° C.) for all Examples to illustrate the effect of the addition of the glycerol monostearate. For Example 11, the extrudate temperature was measured for comparison with the barrel temperature and was found to be about 178° F. (81° C.).

TABLE IV

Pressures at Different GMS* Levels

| Example No. | GMS* (gms) | Extrudate Moisture** (wt. %) | Die Pressure (psig) |
|---|---|---|---|
| 11 | 10 | 21.7 | 4060 |
| 12 | 15 | 21.1 | 3045 |
| 13 | 25 | 21.3 | 2610 |
| 14 | 80 | 20.6 | 2349 |

*Glycerol Monostearate
**Average % Moisture as Extruded

Examples 15–19

Effects of Different Levels of Additives, GMS and Salt, and of Heating the Die The feedstock for each of Examples 15–19, respectively, comprised the standard charge of 4000 grams of semolina described above under the heading "Experimental", 531 grams of water and 15 grams of glycerol monostearate. In Examples 16 and 17, 15 grams of salt were additionally added. In Examples 18 and 19, unlike the other Examples and Controls reported herein, the die housing was heated to 175° F. (79° C.).

The effect of these additional ingredients on the die pressure is seen to be significant, as is the effect of heating the die housing to the temperature of the extruded paste. Where the die housing is heated to approximate the temperature of the alimentary paste, the pressure at the die head approaches that experienced at temperatures of 120° F. (49° C.) and 30% moisture levels for the alimentary paste (standard conditions). Details as to the barrel temperature, extrudate moisture concentration, and die pressure for each Example, respectively, are reported below in Table V.

TABLE V

Pressure at High Temperatures

| Example No. | Barrel Temp. | Extrudate Moisture*** (wt. %) | Die Pressure (psig) |
|---|---|---|---|
| 15 | 185° F. (85° C.) | 21.3 | 2900 |
| 16 | *185° F. (85° C.) | 20.7 | 4133 |
| 17 | *190° F. (88° C.) | 20.8 | 3480 |
| 18 | **170° F. (77° C.) | 22.0 | 2494 |
| 19 | **180° F. (82° C.) | 20.8 | 1798 |

*Salt 15 grams
**Die Head Heated to 175° F. (79° C.)
***Average % Moisture as Extruded

Examples 20–23

Effects of Variations in Moisture Content, Additives Used and Amounts Used, and Different Temperatures The feedstock for each of Examples 20–23, respectively, comprised the standard charge of 4000 grams of semolina and water. The amount of added water was different for each Example and these amounts are specified below in Table VI. The moisture content of the feedstock after water addition was extremely low for each Example, i.e., at about 20 weight percent or below. The pressure at the die head and the extrudate moisture are stated in Table VI along with the barrel temperature, for each Example, respectively. The feedstocks for Examples 20, 21 and 23 contained 15 grams of glycerol monostearate, respectively, while the feedstock for Example 22 contained 20 grams of glycerol monostearate. The Examples show how the combinations of high temperature and the addition of glycerol monostearate provide acceptable pressure levels for pastes with extremely low moisture levels.

TABLE VI

Pressure at Extremely Low Moisture Levels

| Example No. | Barrel Temp. | Added Water (gms) | Extrudate Moisture** (wt. %) | Die Pressure (psig) |
|---|---|---|---|---|
| 20 | 170° F. (77° C.) | 445 | 20.1 | 4133 |
| 21 | 180° F. (82° C.) | 445 | 17.4 | 3770 |
| 22* | 170° F. (77° C.) | 440 | 20.1 | 2900 |
| 23 | 190° F. (88° C.) | 366 | 18.1 | 3915 |

*Contains 20 grams Glycerol Monostearate
**Average % Moisture as Extruded

Product Quality and Appearance: General

The data within Tables VII, VIII and IX characterize the pastes produced by the process of this invention. The pastes were evaluated for quality ( starch gelatinization, protein denaturation) and appearance (color).

Protein Denaturation: General

To determine the extent of protein denaturation which took place during an extrusion, samples from selected Examples were tested for cooking loss and moisture pickup after determining that less than 10% by weight of the starch had been gelatinized. In addition, samples from Controls E and F were tested for cooking loss and moisture pick-up. Both cooking loss and moisture pick-up are representative of protein denaturation and pasta quality.

To determine these values, the dried pasta was added to boiling water and cooked for 8 minutes after returning to a boil. To obtain the percent cooking loss, the drain water was collected and the total solids determined. The total solids in the drain water is expressed in Table VII below as a percentage of the initial raw pasta weight (percent cooking loss). To obtain the amount of the moisture pickup, the cooked pasta was drained for 30 seconds and weighed. The raw pasta weight was subtracted from the cooked weight to provide the value for the amount of moisture picked up.

The samples from Controls E and F were obtained by extruding a paste having about a 30 weight percent moisture content. For Control E, the barrel temperature was 160° F. (71° C.) and the extrudate temperature was about 158° F. (70° C.). For Control F, the barrel temperature was 180° F. (82° C.) and the extrudate temperature was 175° C. (79° C.). The percent cooking loss and moisture pickup for the samples from selected Examples and Controls E and F are provided below in Table VII. The data shows that much less protein denaturation occurs when operating at the high temperatures and low moisture values called for by the process of this invention.

TABLE VII

Protein Denaturation

| Example No. | Barrel Temp. (°F.) | Cooking Loss (wt. %) | Moisture Gain (wt. %) |
|---|---|---|---|
| 1 | 120 (49° C.) | 8.2 | 174 |
| 2 | 130 (54° C.) | 8.8 | 223 |
| 3 | 140 (60° C.) | 8.7 | 182 |
| 4 | 150 (66° C.) | 7.6 | 178 |
| 11 | 175 (79° C.) | 6.0 | 191 |
| 15 | 185 (85° C.) | 8.1 | 208 |
| 17 | 190 (88° C.) | 7.3 | 166 |
| Control C | 120 (49° C.) | 6.7 | 176 |
| Control E | 160 (71° C.) | 10.5 | 215 |
| Control F | 180 (82° C.) | 16.4 | 222 |

Starch Gelatinization: General

Selected Examples were also tested for starch gelatinization following extrusion. To determine the percent starch gelatinization, dried pasta was first ground to a fine powder (40 mesh and finer) within a blender. A 20 gram sample was then mixed with 200 ml of cold distilled water and allowed to stand overnight in a 250 ml graduated cylinder. One gram of gelatinized starch will swell to a volume of 10 ml while one gram of ungelatinized starch will take up a volume of water up to about 2 ml. The amount of gelatinized starch can be determined by measuring the swelled starch volumes. For example, a 20 gram sample of pasta which takes up 56 ml of water contains approximately 10% by weight gelatinized starch. The values obtained for selected Examples are provided below in Table VIII.

TABLE VIII

Starch Gelatinization

| Example No. | Barrel Temp. | Gelatinized Starch (wt. %) |
|---|---|---|
| 4 | 150° F. (66° C.) | 8 |
| 17 | 190° F. (88° C.) | 7 |
| 18 | 170° F. (77° C.) | 5 |
| Control D | 120° F. (49° C.) | 7 |

Coloration/Variegation

Samples prepared in accordance with the conditions set forth in Example 20 and Control C above were evaluated for color content. Color extraction and measurement were done by the American Association of Cereal Chemists (AACC), Method #14–50, incorporated herein by reference, wherein the natural color content is determined by the quantity of Beta-carotene and other carotenoids in the sample. The natural color content of King Midas #H02216 semolina was used as a reference value.

Approximate values for the quantity of Beta-carotene and other carotenoids (color) and % color loss for Example 20 and Control C are shown in Table IX below. This data shows that the unique pasta produced by the present invention maintains more of the natural color of glutinous flour than pasta produced by conventional processes.

Figure 4:
FIG. 4 is a perspective representation of a conventionally extruded pasta in the form of an elbow. More particularly, it represents a sample of an extruded pasta product obtained in Control C, below, and is illustrative of the prior art.

Samples of the pastes from Example 10 and Control C were dried as described above under the heading "Experimental". The extruded pasta of Example 10 had a variegated appearance, as shown in FIGS. 1–3 and the extruded pasta of Control C had a uniform appearance, as shown in FIG. 4. Upon cooking, both pastas were uniform in color.

TABLE IX

| Sample | Barrel Temp. | Added Water | Color (Carotenoids) mg/100 g | % Color Loss |
|---|---|---|---|---|
| King Midas Semolina | — | — | 111 | — |
| Control C | 120° F. (49° C.) | 1158 gms | 51 | 54 |
| Example 20 | 170° F. (77° C.) | 445 gms | 84 | 24 |

Examples 24–29

Effects of Different Amounts of Different Modifying Agents and Different Temperatures The feedstock for each of Examples 24–29, respectively, comprised the standard charge of 4000 grams of semolina, 531 grams added water and 15 grams glycerol monostearate. In addition, a "modifying agent" was added to the feedstock. The "modifying agent" was either sodium bisulfite, calcium sulfite or L-cysteine hydrochloride ($HCl.H_2O$). The amount of "modifying agent" added and the process conditions (barrel temperature and extrudate moisture) are give in Table X below.

In all of Examples 24–29, the extruded paste was uniform in appearance, i.e., the streaks and striations characteristic of the pastas produced in Examples 1–23 were not present. These Examples demonstrate that the process of this invention is capable of producing pastas with a "normal" or conventional appearance. These Examples also demonstrate the effectiveness of small quantities of these modifying agents on the products appearance.

TABLE X

| | Modifying Agents | | |
|---|---|---|---|
| Example No. | Barrel Temp. | Extrudate Moisture* (wt. %) | Modifying Agent |
| 24 | 145° F. (63° C.) | 22.9 | sodium bisulfite (4 gm) |
| 25 | 145° F. (63° C.) | 20.8 | sodium bisulfite (2 gm) |
| 26 | 140° F. (60° C.) | 20.9 | sodium bisulfite (0.8 gm) |
| 27 | 140° F. (60° C.) | 22.2 | sodium bisulfite (0.4 gm) |
| 28 | 140° F. (60° C.) | 22.3 | calcium sulfite (2.4 gm) |
| 29 | 140° F. (60° C.) | 22.4 | L-cysteine ($HCl.H_2O$) (4 gm) |

*Average % Moisture as Extruded

Conclusion for Examples 1–29

The above data in Tables I–VI illustrates how increasing the extrusion temperature to values of 130° F. (54° C.) and above reduces the pressure within the extruder at the extruder die and permits low moisture pastas to be processed without cooking. The data in Tables VII and VIII show that starch gelatinization and protein denaturation (cooking loss) are about average for the pastas extruded by the process of this invention. The unique dried paste formed which retains significantly more of the original color (Beta-carotene and other carotenoids) of the glutinous flour, is shown by the data in Table IX. The data in Table X illustrates the conditions wherein pastas having a conventional appearance were produced.

CONCLUSION: General

While the invention has been disclosed by reference to the details of preferred embodiments, this disclosure is intended in an illustrative rather than in a limiting sense, as it is contemplated that modifications will readily occur to those skilled in the art, within the spirit of the invention and the scope of the appended claims.

What is claimed is:

1. A method of making macaroni products or noodle products wherein said method comprises blending in an extruder that is equipped with a die having a plurality of holes, a feedstock comprised of water and a dry component comprising glutinous flour to form an alimentary paste having a total moisture content at or less than about 28 weight percent, which said total moisture content includes the moisture present in said dry components as supplied to said feedstock, and extruding said alimentary paste through one or more holes in the extruder die, wherein at least 75 percent by weight of said dry component of said alimentary paste comprises glutinous flour, and wherein the temperature of said alimentary paste in said extruder is (1) sufficiently low as to maintain the level of starch gelatinization below 10 weight percent of the total starch content in the extruded alimentary paste and (2) is sufficiently high to provide an internal pressure on the extruder die at a value below about 2500 psig without the incorporation of a modifying agent in said feedstock.

2. The method of claim 1 wherein a portion of said alimentary paste, that is disposed within the bore of the extruder adjacent the extruder die, is maintained at a temperature in the range of above 130° F. to 190° F.

3. The method of claim 1 wherein said alimentary paste in the extruder has a total moisture content in the range from about 20% to about 26% by weight of said paste.

4. The method of claim 3 wherein said glutinous flour is selected from the group consisting of semolina flour, durum flour and mixtures thereof.

5. The process of claim 1 wherein a portion of said alimentary paste, that is disposed within the bore of said extruder adjacent the extruder die, is maintained at a temperature in the range from above 130° F. to about 190° F., and wherein said alimentary paste in the extruder has a total moisture content in the range from about 20% by weight to about 26% by weight of said paste, which said total moisture content includes the moisture present in said dry component as supplied to said feedstock, and wherein said feedstock additionally comprises glycerol monostearate.

* * * * *